United States Patent [19]
Parl et al.

[11] Patent Number: 5,134,715
[45] Date of Patent: Jul. 28, 1992

[54] METEOR SCATTER BURST COMMUNICATIONS SYSTEMS

[75] Inventors: Steen A. Parl, Arlington; Alfonso Malaga, Lincoln, both of Mass.

[73] Assignee: Sundstrand Corporation, Rockford, Ill.

[21] Appl. No.: 438,658

[22] Filed: Nov. 17, 1989

[51] Int. Cl.$^5$ ............................................. H04B 7/00
[52] U.S. Cl. ................................. 455/64; 455/272; 455/56.1
[58] Field of Search ............... 455/54, 56, 63, 272, 455/273, 276, 64, 25; 342/367

[56] References Cited

U.S. PATENT DOCUMENTS

| | | | |
|---|---|---|---|
| 2,239,775 | 4/1941 | Bruce | 342/367 |
| 3,020,399 | 2/1962 | Hollis | 455/63 |
| 3,757,335 | 9/1973 | Gruenberg | 455/25 |
| 4,277,945 | 7/1981 | Smith et al. | |
| 4,845,504 | 7/1989 | Roberts et al. | 455/54 |
| 4,985,707 | 1/1991 | Schmidt et al. | 455/56 |

Primary Examiner—Reinhard J. Eisenzopf
Assistant Examiner—Edward Urban
Attorney, Agent, or Firm—Dike, Bronstein, Roberts & Cushman

[57] ABSTRACT

A meteor scatter communications system for communicating between a master station and one or more remote stations. In one exemplary embodiment, a broad beam transmitter probe signal is reflected from a meteor ionization trail to a remote station which then transmits a return data signal to the master station. The master station receiver has a plurality of antennas and a receiver beam forming network which forms a plurality of narrow beam receive signals, one of which has a high gain and corresponds to the narrow beam signal which illuminates the meteor trail and contains the reflected return data signal from the remote station. The master station processor selects such one narrow beam signal for processing the data therein. The transmitter at the master station, if desired, can then transmit a further narrow beam message signal containing a message to the remote station using a transmit beam forming network to provide a selected narrow beam transmit signal for reflection from the meteor trail to the remote station.

19 Claims, 7 Drawing Sheets

METEOR SCATTER BURST COMMUNICATIONS SYSTEMS

INTRODUCTION

This invention relates generally to digital data communications systems and, more particularly, to meteor scatter burst communications systems for providing communication between a master station and one or more remote stations using beam formation techniques for improving the performance of such systems.

BACKGROUND OF THE INVENTION

Meteor scatter burst communications systems have been known and used for many years to provide for relatively inexpensive, low data rate, long distance communication of data, particularly digital data, between a master station and one or more remote stations. A basic description of a typical meteor scatter burst communications system, for example, is contained in U.S. Pat. No. 4,277,845 issued on Jul. 7, 1981 to Dale K. Smith et al.

As described therein, a master station transmits digital radio probing signals which are then reflected from the ionization trails left by meteors which have entered into and are travelling through the earth's upper atmosphere (at an altitude of about 50-70 miles above the earth's surface, for example). Such trails result from the ionization of air particles through which the meteor travels. Such ionization trails exist for only a short time interval e.g., from a few milliseconds to a few seconds, so that a signal burst transmission mode is usually used for transmitting probing signals from a master station for reflection (i.e., scattering) from the meteor trail to one or more of the remote stations and for transmitting data from a remote station by reflection from the meteor trail back to the master station.

It is found that meteor communication systems can be used to communicate over relatively long distances, e.g., up to 1000 miles, or greater, using relatively inexpensive equipment therefor. In one use of such systems, as described in the aforesaid Smith et al. patent, such systems can be used to transmit weather data from one or more remote stations to a master station. Such data may include, for example, data as to temperature, snow depth, precipitation, wind velocity, and the like, at relatively inaccessible regions where the remote stations are located.

The durations of the signal bursts, i.e., the probing signals and the return data signals, or additional signals, as discussed below, are selected so that the overall time for their transmission does not exceed the time of duration of a typical meteor trail. Thus, such bursts may normally range, for example, from tens of milliseconds to hundreds of milliseconds.

In applications where the master station transmits with relatively high power and a remote station transmits its reply with relatively low power, the remote station will be able to detect the probing signal frequently but replies will not be received by the master station as often because of the difference in the transmitting powers thereof. A further problem arises when the signal-to-noise (S/N) ratio at the remote station is not as high as is desirable, i.e., the remote station is in a radio signal "noisy" environment so that the signal transmitted from the master station cannot be readily recognized and separated from the noise which accompanies it.

A common technique for improving the performance of systems using low power transmitters is to use higher gain antennas. Such an approach, however, is often not useful for master stations used in meteor burst scatter communication systems because providing higher gain antennas at the master station means that narrower beam antennas must be used. Since it is desirable that a master station capture as many signals as possible reflected from a large number of meteor trails, it is normally desirable that relatively broad beam antennas be used thereat. If narrow beam antennas are used then many otherwise useful meteor trails would fall outside the scope of the narrow beam antenna and, accordingly, the effectiveness of the meteor scatter system would be reduced.

Accordingly, it is desirable to improve performance so as to enhance the communication between master and remote stations by devising some other technique for compensating for, or overcoming the difference in, the transmitting powers of the master and the remote stations, as well as compensating for the effects of the noise environment which may exist at the remote stations. It is desirable that such improved performance be accomplished without eliminating any potentially useful meteor trails. It is further desirable that such a technique be useful in enhancing communications not only between a master station and one or more remote stations but also between two or more master stations so as to provide greater data throughput, for example, or to provide the same data throughput with fewer errors.

BRIEF SUMMARY OF THE INVENTION

In accordance with the invention, a beam forming technique is used for improving the performance of meteor scatter communications systems. The invention permits the transmission and reception of signals reflected, or scattered, from meteor trails that occur randomly at different locations in the earth's upper atmosphere in effect by using antenna beams which are narrower than the range of angles over which the meteor trails can occur. In one preferred embodiment, for example, a master station employs an array of receiver antennas and the beam forming network is designed to combine the signals received at the antennas in such a way as to provide a plurality of narrow beam receiver signals, one of which corresponds to an effective narrow beam signal which includes the return signal from the remote station, which narrow beam signal has an amplitude level substantially greater than that of the signals received at any one of the antennas of the array thereof. Such narrow beam return signal has a higher signal-to-noise ratio than is otherwise possible when using a single receiver antenna without the use of such a beam forming technique. The invention is particularly useful for meteor scatter communications from remote stations which have relatively low transmitter power, typically between 100 to 300 watts. The beam forming technique of the invention is also useful for enhanced transmissions to remote stations that may be located in areas where radiation noise levels are high. The higher signal-to-noise ratios which can be achieved using such a beam forming technique further allows users of the system to reduce the average waiting time between transmissions, and thus increases the amount of information that can be transmitted over the meteor scatter communications link. Systems in accordance with the invention are applicable to all meteor scatter systems, e.g., broadcast one-way transmission systems, and two-way half-duplex or full-duplex transmission systems.

DESCRIPTION OF THE INVENTION

The invention can be described in more detail with the help of the accompanying drawings wherein.

Figure 1:
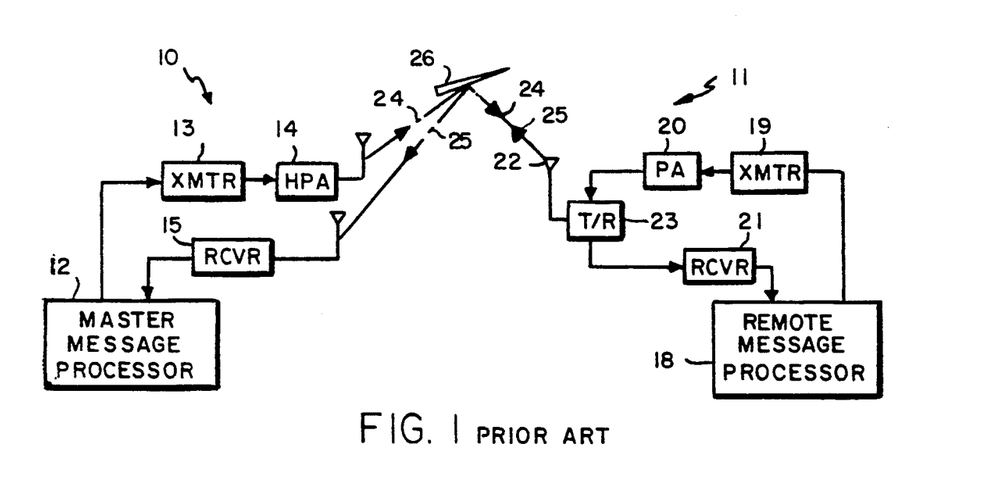
FIG. 1 shows a block diagram of a typical meteor burst scatter communications system of the prior art.

A typical meteor scatter communications system using a master station and one or more remote stations is shown in FIG. 1, which depicts a master station 10 and, for clarity, only one of the remote stations 11. The master station and remote station each typically consist of message processors 12 and 18, respectively, transmitter circuits 13 and 19, respectively, and receiver circuits 15 and 21, respectively. The master station uses a high power amplifier 14 for supplying a transmitter signal to a transmit antenna 16 and further utilizes a receiver antenna 17 for receiving data signals from remote station 11 for subsequent processing by processor 12. The remote station uses a power amplifier 20 for transmitting data signals via antenna 22. The receiver 21 thereof can receive signals from antenna 22 via a transmit/receive (T/R) switch 23 for supplying such signals, in a receive mode, to processor 18 for processing of the data therein. The functions performed by each component shown in FIG. 1 are well known to those in the art and, as seen therein, the master station operates in a full-duplex mode using different antennas for transmitting and receiving, while the remote station is shown as operating in a half-duplex mode using the same antenna for transmitting and receiving. Remote stations are typically operated in a half-duplex mode using one antenna and either the same frequency or different frequencies for transmit and receive operations, although such stations could be arranged, if desired, for full-duplex operation.

In such a meteor scatter communications system a master station broadcasts a broad beam probing signal 24, either continuously or at regular intervals, and a meteor trail 26 in the atmosphere above the earth reflects (scatters) the probing signal back to earth in a continuously changing pattern. When a meteor produces a trail in the proper location, the probing signal is reflected therefrom to a remote station which is able to receive and detect the probing signal, and to reply with a short burst of data 25 which is in turn reflected from the meteor trail back to the master station. The master station can follow its reception of the burst of data from the remote terminal with another short burst signal acknowledging receipt of the data or with a further message of its own.

The master station is usually able to employ relatively high transmitter power, e.g., 1 to 5 kW, and medium gain antennas (5 to 12 dBi), while a remote station is often limited in its transmitter power, e.g., 100 to 300 W, uses relatively low gain antennas, and is relatively small and low in weight, so as to be relatively compact and inexpensive to make, install and operate. In addition, the master station usually has a fixed location and, hence, can be purposely positioned in an environment where the radio noise level is low, while the remote stations may be mobile or located in regions which may be exposed to medium to high radio noise levels.

Figure 2:
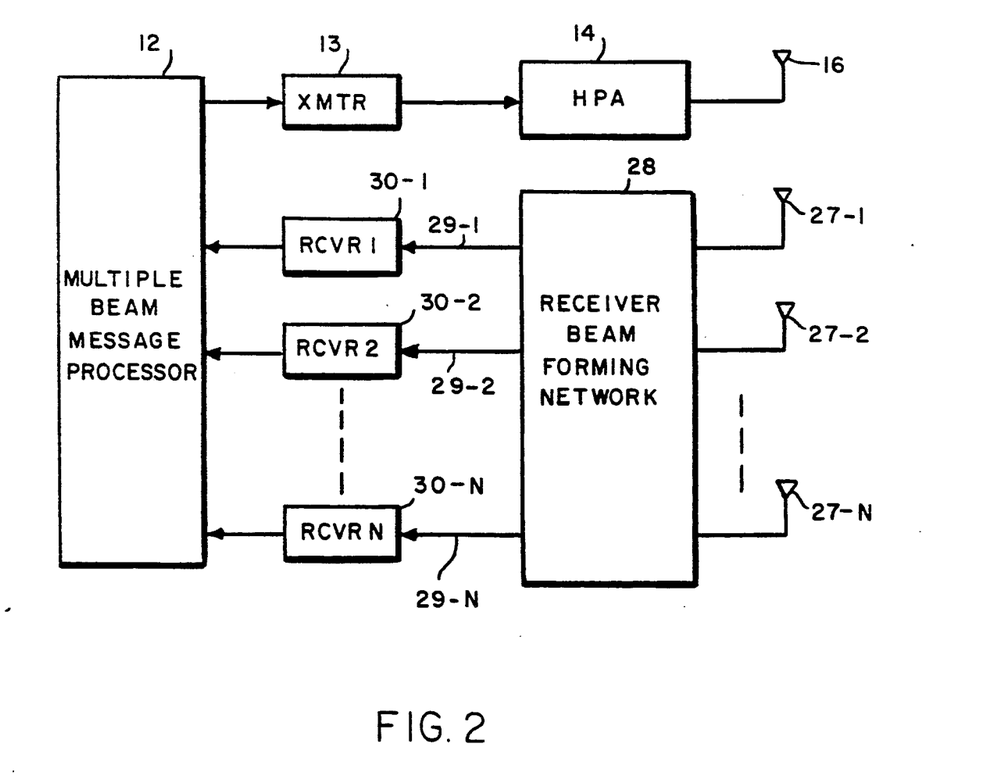
FIG. 2 shows a block diagram of one embodiment of a master station in accordance with the invention for use in a meteor scatter communication system.

In order to improve the operation of a system such as depicted in FIG. 1, in accordance with the invention, a master station, such as shown in the embodiment of FIG. 2, can be used. As seen therein, the master station uses a plurality of N receive antennas 27-1, 27-2 ... 27-N. The signals received at the antennas are supplied to a receiver beam forming network 28 which appropriately combines the signals N times to supply a plurality of N narrow beam receive signals to a plurality of N receivers 30-1, 30-2 ... 30-N. The narrow beam signal output from a selected one of the N receivers, which corresponds to a narrow beam containing the return signal from the remote station, as discussed below, is supplied to processor 12 for processing as described below. Each antenna at the master station and the antennas at each remote station roughly illuminate, for transmission or reception purposes, the same general, relatively broad beam region of the atmosphere.

During the probing operation, the master station continually, or at frequent intervals, transmits, via transmitter 13, high power amplifier 14, and antenna 16, a broad beam probing signal which contains suitable digital identification information, which is reflected from a meteor trail, when such trail exists, for reception at a remote station. The remote station receives and identifies the probing signal as one from that particular master station and transmits a suitably indentifiable return data signal via its broad beam antenna for reflection from the meteor trail back to the master station.

Broad beam signals are received by the receiver antennas 27-1 ... 27-N at the master station and the beam forming network responds to such antenna signals by combining them in N different ways to form N different narrow beam receive signals 29-1, 29-2 ... 29-N which, in effect, represent N different narrow beams which illuminate different regions of the atmosphere.

Figure 3:
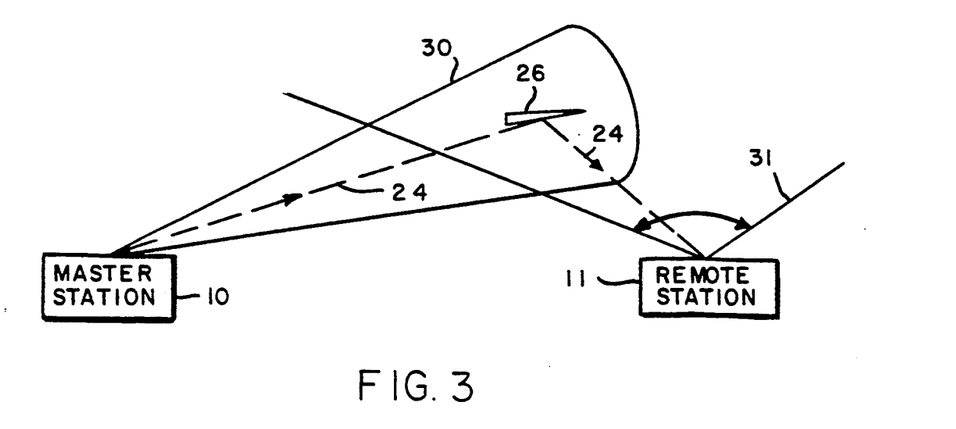
FIG. 3 shows a diagrammatic view of a broad beam probe signal from a transmitting station.
Figure 3A:
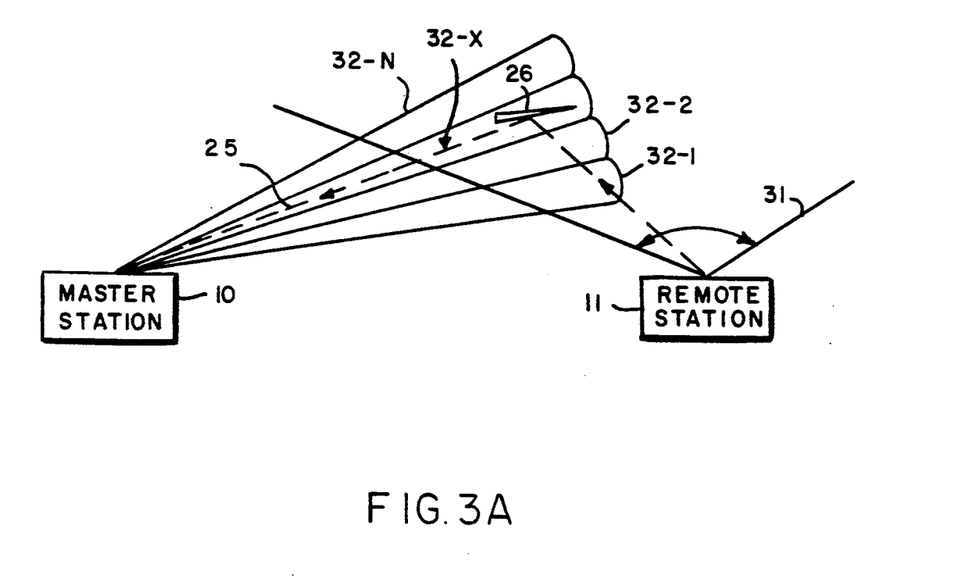
FIG. 3A shows a diagrammatic view of a broad beam return signal from a receiving station and a plurality of narrow beam signals formed therefrom at the transmitting station.

Such concept can be illustrated, for example, in FIGS. 3 and 3A. FIG. 3 shows a broad beam probing signal 30, transmitted from master station 10, the volume of the probing beam being sufficiently broad to encompass the region of the atmosphere where a meteor trail 26 has arisen. The specific portion (dashed line 24) of the broad beam probe signal 30 which is reflected from meteor trail 26 is received at remote station 11 which station, in turn, transmits a return data signal which also has a wide beam pattern 31. A portion (dashed line 25) of the broad beam return signal is reflected from meteor trail 26 to master station 10 for reception by the antennas 27-1, 27-2 ... 27N thereof.

The combining of such received signals in beam forming network 28 provides a plurality of narrow beam signals 29-1 ... 29-N, each of which, in effect, represents a corresponding one of N narrow receiver beams 32-1, 33-2 ... 33-N depicted in FIG. 3A. The total volume illuminated by the N narrow beams 32-1 ... 32-N is substantially the same as that illuminated by each antenna 27-1 ... 27-N, the overall volume being substantially equivalent to that of broad beam 30. The array of antennas 27-1 ... 27-N and the beam forming network are configured to produce a plurality of narrow beam receive signals 29-1 ... 29-N which effectively correspond to narrow beams 32-1 ... 32-N, the latter being produced both in azimuth and/or in elevation. The gain of each narrow beam receive signal 29-1 ... 29N is N times higher than the gain of each individual antenna.

Thus, in the embodiment described, the master station broadcasts a broad beam probing signal using a single antenna 16 having medium gain and broad beamwidth. When a remote station detects the reception of the probing signal, it replies with an identifiable return data message signal which is broadcast from its wide beam antenna 22. The message is, in effect, received via one of the narrow beams 32-1 ... 32-N, which contains the meteor trail 26, such as depicted by beam 32-X in FIG. 3A. Such high gain receive beam compensates for the relatively low transmit power at the remote station, thereby considerably increasing the likelihood of correct message reception by the master station. Since the master station has no a priori knowledge of which of the receive beams 32-1 ... 32-N illuminates the meteor trail 26, the master station is provided with multiple receivers 30-1 ... 30-N, one for each narrow beam receive signal 29-1 ... 29-N found by the beam forming network 28, which signals correspond to beams 32-1 ... 32-N. The processor 12 processes the outputs of receivers 28-1 ... 28-N and selects the output from that receiver which produces a valid error-free message, i.e., the high gain receive signal 29-X which is formed by beam forming network 28 and which corresponds to the return signal supplied via narrow beam 32-X.

The structure and operation of beam forming network 28 would be well known to those in the art. For example, such network can utilize a signal combining technique of the "Butler" matrix type, such as discussed in the text by M. I. Skolnik, "Introduction to Radar Systems", McGraw-Hill Book Co., N.Y., 1980, pp. 310–314. The N antenna signals are combined, in accordance with such matrix-combining technique, in N different ways so that the signal corresponding to beam 32-X (FIG. 3A), containing the desired identifiable message data signal from the remote station, is supplied as output of a selected one of the receivers 30-1 ... 30-N. The outputs of the remaining receivers do not contain such identifiable message. For example, the output of the selected receiver, as obtained by using beam forming network 28, has an amplitude which N times that of the return signal received at antennas 27-1 ... 27-N, while the outputs of the remaining receivers not containing the return signal have low amplitudes.

Accordingly, the outputs of all the receivers can be suitably processed to identify and select for processing only the one containing the correct message data from the remote station, i.e., the receiver signal which corresponds to the message containing beam signal 32-X. Appropriate processing techniques for identifying and selecting the correct signal for processing would be well-known to the art. For example, since the correct message can be suitably encoded at the remote station for identification purposes, an appropriate decoding process can be used at processor 12 to readily identify the correct message output since the outputs of all other receivers will not contain the required encoded information.

Thus, while the master station illuminates a large volume during the broad beam probing operation, the use of the beam forming technique in the receiver thereof in accordance with the invention in effect concentrates the master station receive antenna gain in the direction of the usable meteor trail essentially instantaneously and in a relatively simple manner which does not require adaptive steering of the beams involved.

Following the decoding of the received message from the remote station, the master station can be arranged to transmit a further message to acknowledge receipt of the remote station message or it can transmit a further message of its own to the remote station, again using its broad beam transmit antenna, or alternatively using a narrow beam transmission technique, as discussed more fully below.

Figure 4:
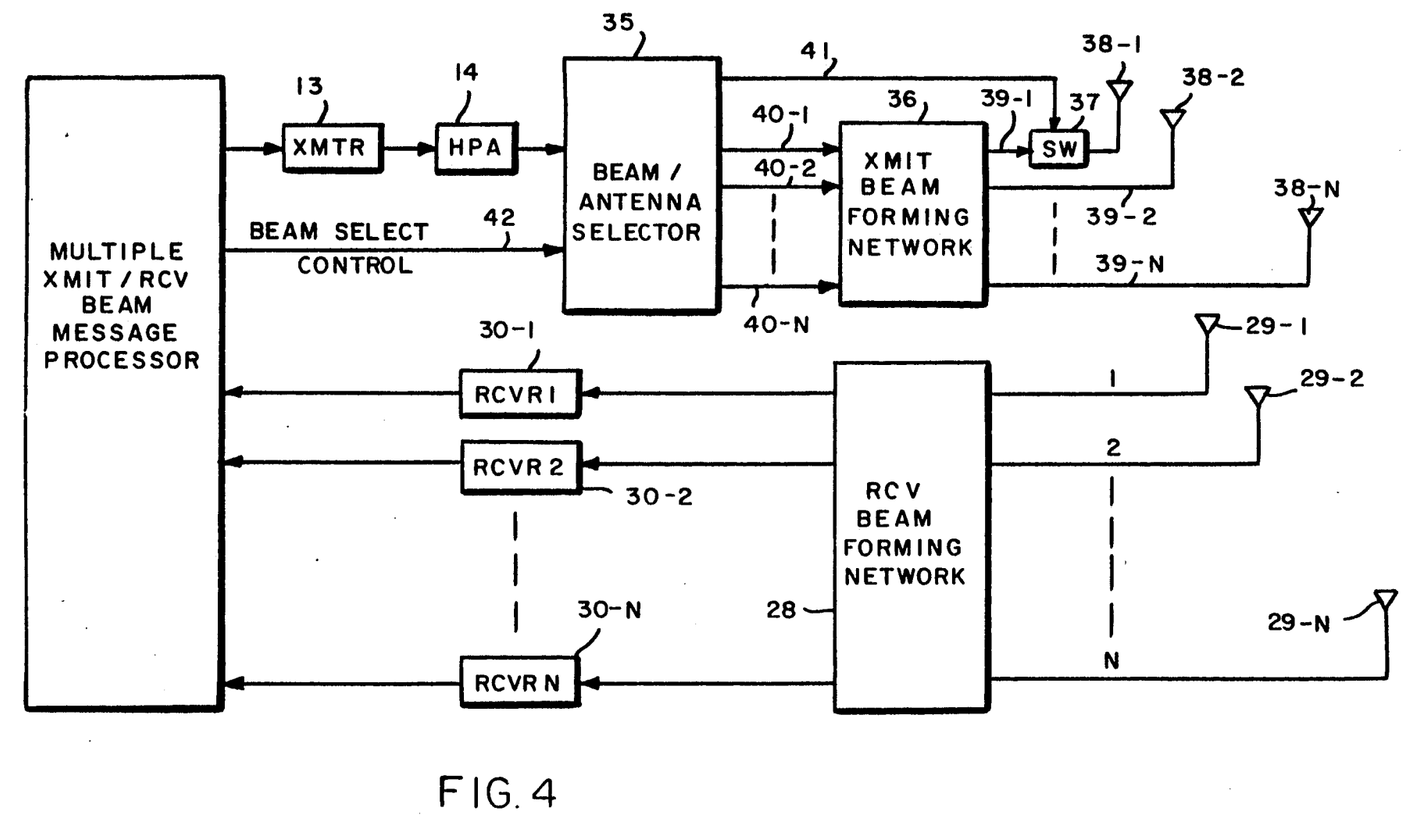
FIG. 4 shows a block diagram of another embodiment of a master station in accordance with the invention.

Thus, as shown in the embodiment of FIG. 4, the single antenna 16 in FIG. 2 is replaced with an antenna array comprising N antennas 38-1, 38-2, ... 38-N. A transmit beam forming network 36 is used to supply N narrow beam signals 39-1, 39-2 ... 39-N, as formed from a plurality of N input signals 40-1, 40-2 ... 40-N, to the antenna array. The latter signals are supplied via a beam/antenna selector network 35. A signal switching network 37 is used to supply to one of the antennas, e.g., antenna 38-1, either a broad beam signal 41 from high power amplifier 14 or a narrow beam signal 39-1 from transmit beam forming network 36. A beam select control signal 42 controls the beam/antenna selector network 35 so as to select a broad beam signal 41 or the multiple narrow beam signals 40-1 ... 40-N for supply to antennas 38-1 ... 38-N.

In FIG. 4, for example, initially the master station transmits a broad beam probe signal, the beam/antenna selector 35 being controlled so that the separate broad-beam signal 41 is supplied to a medium gain antenna 38-1 via switch 37 so that only one antenna of the array of antennas transmits the broad beam probe signal. When the remote station detects the probe signal, it replies with a short message data signal which is received via the receive beam which best illuminates the meteor trial, as discussed above with respect to the receiver antenna array 27-1 ... 27N. The message processor 12 selects the receive beam which produces an error-free message, e.g., the strongest received signal, and processes the data therein as discussed above. Once this information is received and processed by the processor, the master station processor can transmit an acknowledge signal or a further message signal to the remote station as a narrow beam signal. In such case, the beam/antenna selector 35 is controlled to supply the message signals 40-1 ... 40-N to the transmit beam forming network 36 which produces a desired narrow beam signal at a selected one of the antennas 38-1 ... 38-N which produces the appropriate narrow beam signal for reflection from meteor trail 26. The effective power radiated at such antenna using such transmit beam forming technique is N times higher than that of any one of the signals 40-1 ... 40-N and compensates for the higher noise levels which are encountered at the remote station sites. The operation of transmit beam forming network 36 is essentially the same as that of receiver beam forming network 28, already discussed above.

Figure 5:
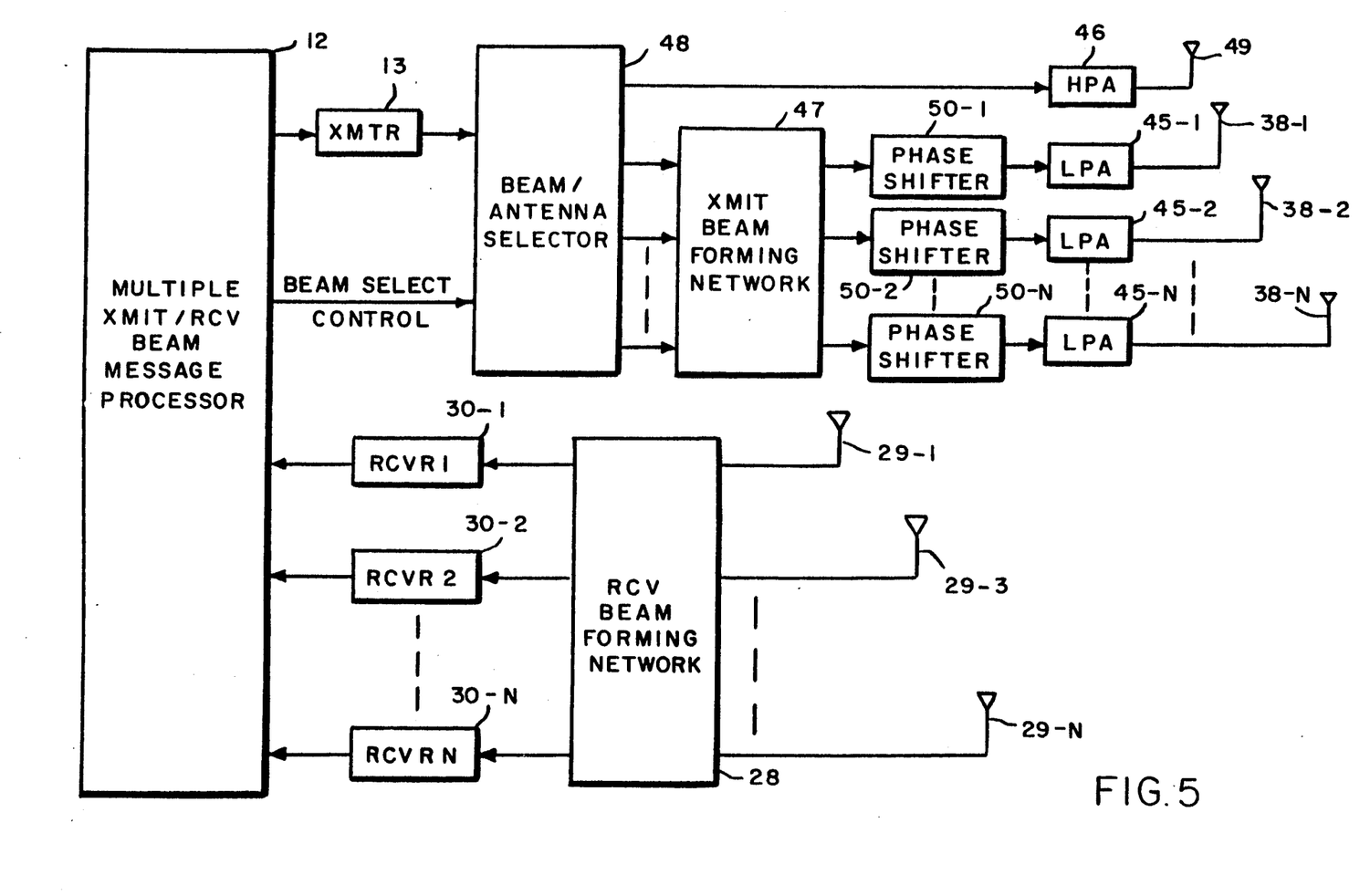
FIG. 5 shows a block diagram of still another embodiment of a master station in accordance with the invention.

Another embodiment for providing transmit and receive beams for full-duplex master station operation is shown in FIG. 5. Instead of using a high power beam-/antenna selector 35 and transmit beam forming matrix 36, as shown in FIG. 4, N distributed low power amplifiers 45-1, 45-2 ... 45-N are used with antennas 38-1 ... 38-N and a separate high power amplifier 46 and separate transmitting antenna 49 are used for the probe signal. A low power transmit beam forming network 47 supplies combined signals to low power amplifiers 45-1 ... 45-N under control of beam/antenna selector 48.

The technique for selecting the transmit and received beams is essentially the same as in FIG. 4, the broad beam probe beam signal being supplied initially via high power amplifier 46 to antenna 49, while any subsequent transmitted narrow beam messages are supplied via low power beam forming network 47 and low power amplifiers 45-1 ... 45-N to antennas 38-1 ... 38-N. In such embodiment, the low power amplifiers are normally selected so as to be well matched in their delay characteristics, although with use over time there may be variations in the delay characteristics of each amplifier. Phase shifter networks 50-1, 50-2 ... 50-N can be used to compensate for such different delay characteristics so as to assure continued delay matching of the amplifier characteristics.

Figure 6:
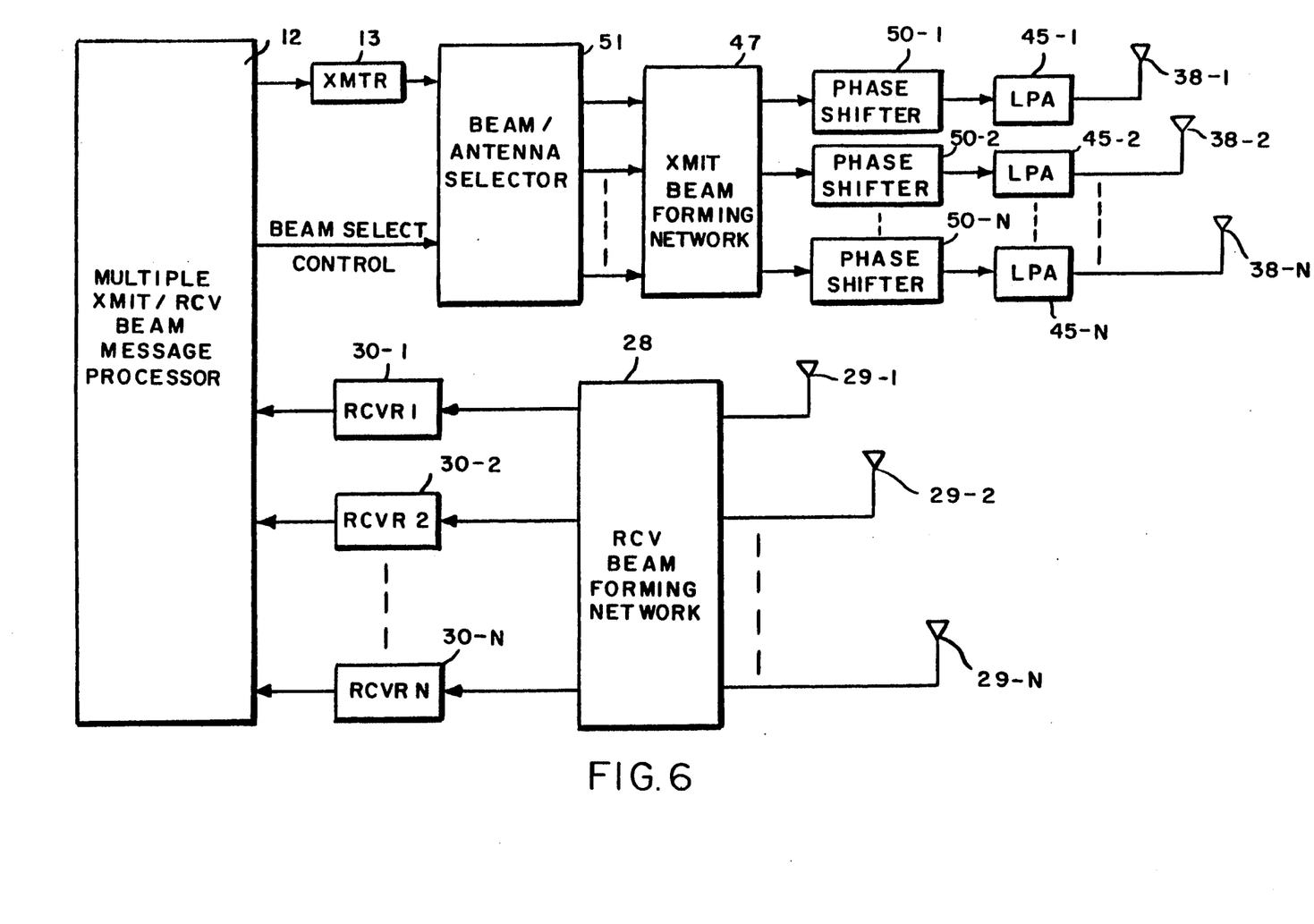
FIG. 6 shows a block diagram of still another embodiment of a master station in accordance with the invention.

A still further alternative embodiment of the invention is shown in FIG. 6. As seen therein, simultaneous transmission of all beams at all antennas 38-1 38-2 ... 38-N can be used for providing a broad beam probing signal, as controlled by the beam/antenna selector network 51, and or a single high gain narrow beam can be transmitted, under control of selector network 51, from one of the antennas for transmitting further messages once communication has been established. In this way, the need for a separate high power amplifier and antenna for transmitting the probe signal is avoided.

Figure 7:
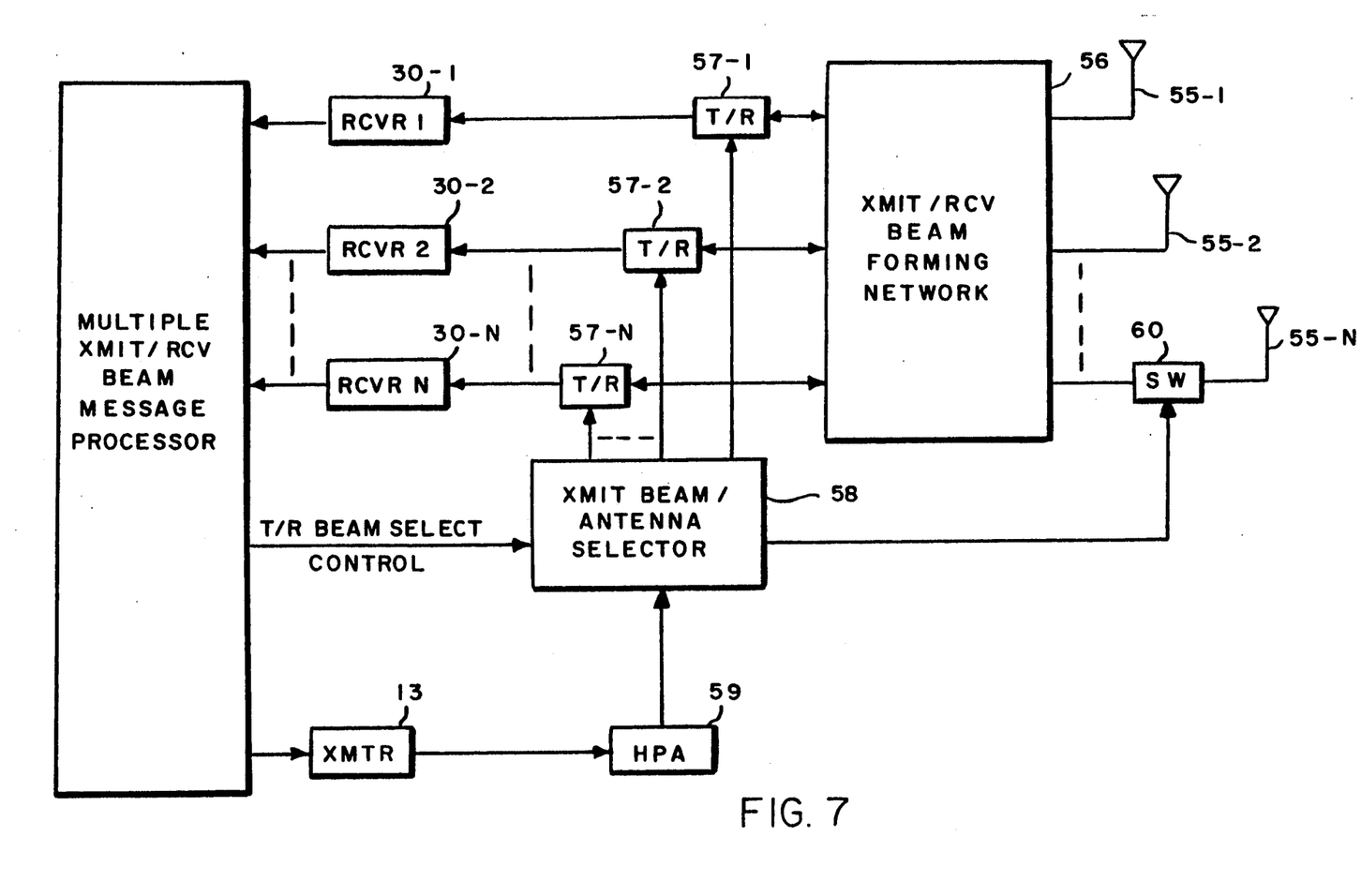
FIG. 7 shows a block diagram of still another embodiment of a master station in accordance with the invention.

While the above embodiments use full-duplex transmit and receive operating modes for the master station, using different frequencies for each, for example, the master station can also be arranged to operate in a half-duplex operation as shown in FIG. 7. In such case, a single array of antennas 55-1, 55-2 ... 55-N is used with a single transmit/receive beam forming network 56. Suitable T/R switches 57-1, 57-2 ... 57-N are used to set up for either a transmit or a receive mode of operation. During a transmit mode, a transmit beam/antenna selector network 58 selects one of three operations. Thus, for transmission of the probing signal, a high power amplifier 59 supplies a broad beam probing signal to a single antenna, e.g., antenna 55-N, via switch 60. Alternatively, the probing signal from amplifier 59 can be supplied simultaneously to all antennas 55-1 ... 55-N via beam forming network 56 with the T/R switches 57-1 ... 57-N in the transmit mode to produce the broad beam probing signal. As a further alternative, a narrow beam message signal can be supplied to a selected one of the antennas via beam forming networks 56 for providing such narrow beam message signal. During the receive mode, the receivers 30-1 ... 30-N are used, in the manner as discussed above with respect to previously described receiver operation, with the T/R switches 57-1 ... 57-N in the receive mode.

Figure 8:
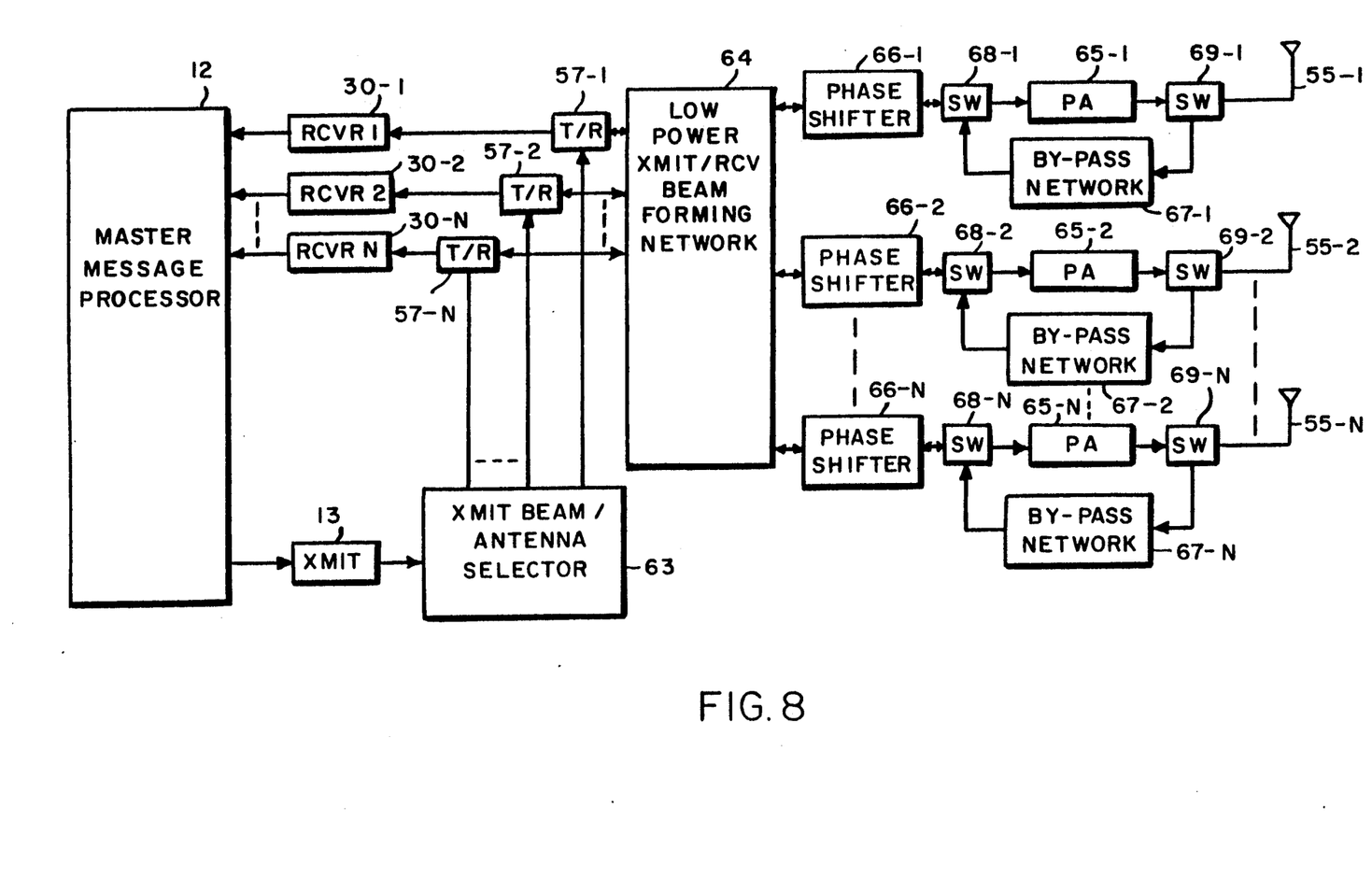
FIG. 8 shows a block diagram of still another embodiment of a master station in accordance with the invention.

In a still further embodiment of FIG. 8, the need for a separate high power amplifier, beam/antenna selector and beam forming network can be avoided, effectively in the same manner as in FIG. 6, by using low power amplifiers 65-1, 65-2, ... 65-N following a low power transmit/receive beam forming network 64. A probing signal is supplied from all antennas 55-1 ... 55-N during transmission mode via the beam forming network 64 under control of transmit beam/antenna selector 63 via power amplifiers 65-1 ... 65-N and switches 68-1 ... 68-N and 69-1 ... 69-N. Suitable phase shifters 66-1 ... 66-N can also be used with power amplifiers 65-1 ... 65-N, as discussed above. During the receiver mode, the received signals from antennas 55-1 ... 55-N are supplied to beam forming network 64 via by-pass networks 67-1 ... 67-N and switches 68-1 ... 68-N and 69-1 ... 69-N, the outputs of the beam forming network being supplied to receivers 30-1 ... 30-N as discussed above. Receiver power amplification may be obtained at the by-pass networks or at the receivers, or partially at both locations. A separate high power amplifier for transmission, as used in FIG. 7, is not required.

While the above discussion discloses various embodiments of the invention, modifications thereto within the spirit and scope of the invention may occur to those in the art. Hence, the invention is not to be construed as limited to the specific embodiments described, except as defined by the appended claims.

What is claimed is:

1. A system for providing communication between at least two stations via a medium containing one or more reflective elements, said system comprising
   a transmitter at one of said stations for broadcasting a broad beam probe signal to said medium, a reflective element in said medium reflecting said broad beam probe signal to direct a reflected probe signal to at least one other of said stations;
   said at least one other station receiving said reflected probe signal and transmitting a broad beam return signal containing data to be processed, said return signal being transmitted to said reflective element for reflection therefrom to said one station;
   said one station further including
   a receiver including
      receive beam forming means responsive to signals received at said one station from said medium for forming a plurality of narrow beam receive signals corresponding to receive beam signals illuminating a plurality of different regions of said medium, one of said narrow beam receive signals corresponding to a beam signal which illuminates the region of said medium containing said reflective element, said one narrow beam received signal containing said reflected return signal and having a power level greater than that of any one of the signals received at said one station; and
   signal processing means for selecting said one narrow beam receive signal from said plurality of narrow beam receive signals and processing the data contained therein.

2. A system in accordance with claim 1 and further wherein
   said one station includes
      transmit beam forming means for forming a plurality of narrow beam transmit signals which illuminate a plurality of different regions of said medium which substantially correspond to the plurality of different regions illuminated by said plurality of narrow beam receive signals; and means for transmitting a further message to said at least one other station using a selected one of said plurality of narrow beam transmit message signals which illuminates the region of said medium containing said reflective element for transmitting said message to said reflective element for reflection therefrom to said other station.

3. A system in accordance with claim 2 wherein said one station is a master station, said at least one other station is at least one remote station, and said one or more reflective elements are one or more meteor ionization trails.

4. A system in accordance with claim 3 wherein
said transmitter includes a probe transmit antenna for broadcasting said probe signal; and
said receiver includes a plurality of receive antennas for receiving the received signals at said master station.

5. A system in accordance with claim 4 and further including a plurality of further transmit antennas responsive to the plurality of narrow beam signals from said transmit beam forming means and means for selecting one of said further transmit antennas corresponding to said selected one of said narrow beam transmit message signals for transmitting said selected transmit message signal.

6. A system in accordance with claim 5 wherein said plurality of further transmit antennas includes said probe transmit antenna and further including switch means for supplying said probe signal to said probe transmit antenna during a probe transmit mode of operation and for supplying a signal from said transmit beam forming means during a message transmit mode of operation.

7. A system in accordance with claim 5 and further including a high power amplifier for supplying a high power probe signal to said probe transmit antenna and a plurality of low power amplifiers for supplying said narrow beam transmit message signals to said further transmit antennas.

8. A system in accordance with claim 7 and further including a plurality of phase shift networks for matching the delay characteristics of said plurality of low power amplifiers.

9. A system in accordance with claim 3 wherein said transmitter includes
a plurality of transmit antennas and power amplifiers corresponding thereto responsive to said beam forming means for transmitting narrow beam transmit signals from said transmit antennas; and means for controlling the operation of said transmit beam forming means and said transmit antennas of transmitting a plurality of narrow beam probe transmit signals from all of said transmit antennas during a probe transmit mode of operation and for transmitting a high gain narrow beam transmit message signal from a selected one of said transmit antennas during a message transmit mode of operation.

10. A system in accordance with claim 9 and further including a plurality of phase shift networks corresponding to said power amplifiers for matching the delay characteristics of said power amplifiers.

11. A system in accordance with claim 3 wherein a single beam forming means is used as both a transmit beam forming means and a receive beam forming means and said plurality of antennas is used as both a plurality of transmit antennas and a plurality of receive antennas, one of said antennas being used as a probe transmit antenna, and further including transmit/receive switch means for supplying said selected narrow beam transmit message signal to a selected one of said antennas for transmission therefrom during a message transmit mode of operation and for selecting said one narrow beam receive signal during a receive mode of operation.

12. A system in accordance with claim 11 and further including antenna switch means for supplying a probe transmit signal to one of said antennas for transmission therefrom during a probe transmit mode of operation.

13. A system in accordance with claim 12, and further including a high power amplifier for supplying a high power signal to said single beam forming means during said message transmit mode and for supplying a high power probe signal to said antenna switch mean during said probe transmit mode.

14. A system in accordance with claim 11 and further including a plurality of power amplifiers corresponding to said plurality of antennas and responsive to signals from said beam forming network during said probe transmit mode and said message transmit mode, and a plurality of switching means for supplying a broad beam probe signal from all of said antennas during said probe transmit mode and for supplying a high gain narrow beam message transmit signal from a selected one of said antennas during a message transmit mode.

15. A system in accordance with claim 14 and further including a plurality of phase shift networks corresponding to said plurality of power amplifiers for matching the delay characteristics of said amplifiers.

16. A system in accordance with claim 15 and further including a plurality of by-pass networks for providing communication paths which by-pass said power amplifiers during a receive mode of operation, and wherein said plurality of switching means supplies received signals from said plurality of antennas to said beam forming network via said by-pass networks.

17. A system in accordance with claim 2 wherein said one station is a master station, said at least one other station is at least one other master station, and said one or more reflective elements are one or more meteor ionization trails.

18. A system in accordance with claim 1 wherein said one station is a master station, said at least one other station is at least one remote station, and said one or more reflective elements are one or more meteor ionization trails.

19. A system in accordance with claim 1 wherein said one station is a master station, said at least one other station is at least one other master station, and said one or more reflective elements are one or more meteor ionization trails.

* * * * *